United States Patent

[11] 3,597,029

| [72] | Inventor | Elias M. Marcum |
| | | 404 Swank Court, Union, Ohio 45322 |
| [21] | Appl. No. | 850,906 |
| [22] | Filed | Aug. 18, 1969 |
| [45] | Patented | Aug. 3, 1971 |

[54] PLANETARY BEARING ASSEMBLY
8 Claims, 6 Drawing Figs.

[52] U.S. Cl.................................................. 308/183
[51] Int. Cl..................................................... F16c 19/00
[50] Field of Search.......................................... 308/183, 179

[56] References Cited
UNITED STATES PATENTS
1,366,966  2/1921  Spear ........................... 308/183
1,433,014  10/1922 Kennedy ....................... 308/183
3,025,114  3/1962  Beecher ......................... 308/183
FOREIGN PATENTS
1,284,704  1/1962  France .......................... 308/183

Primary Examiner—Martin P. Schwadron
Assistant Examiner—Frank Susko
Attorney—Jerome P. Bloom ABSTRACT: A bearing assembly incorporating at least one planetary race element between sets of bearings which are radially spaced and differentially sized. A preferred embodiment utilizes raceways the bearing surfaces of which are equidistantly and successively offset from a common plane of reference.

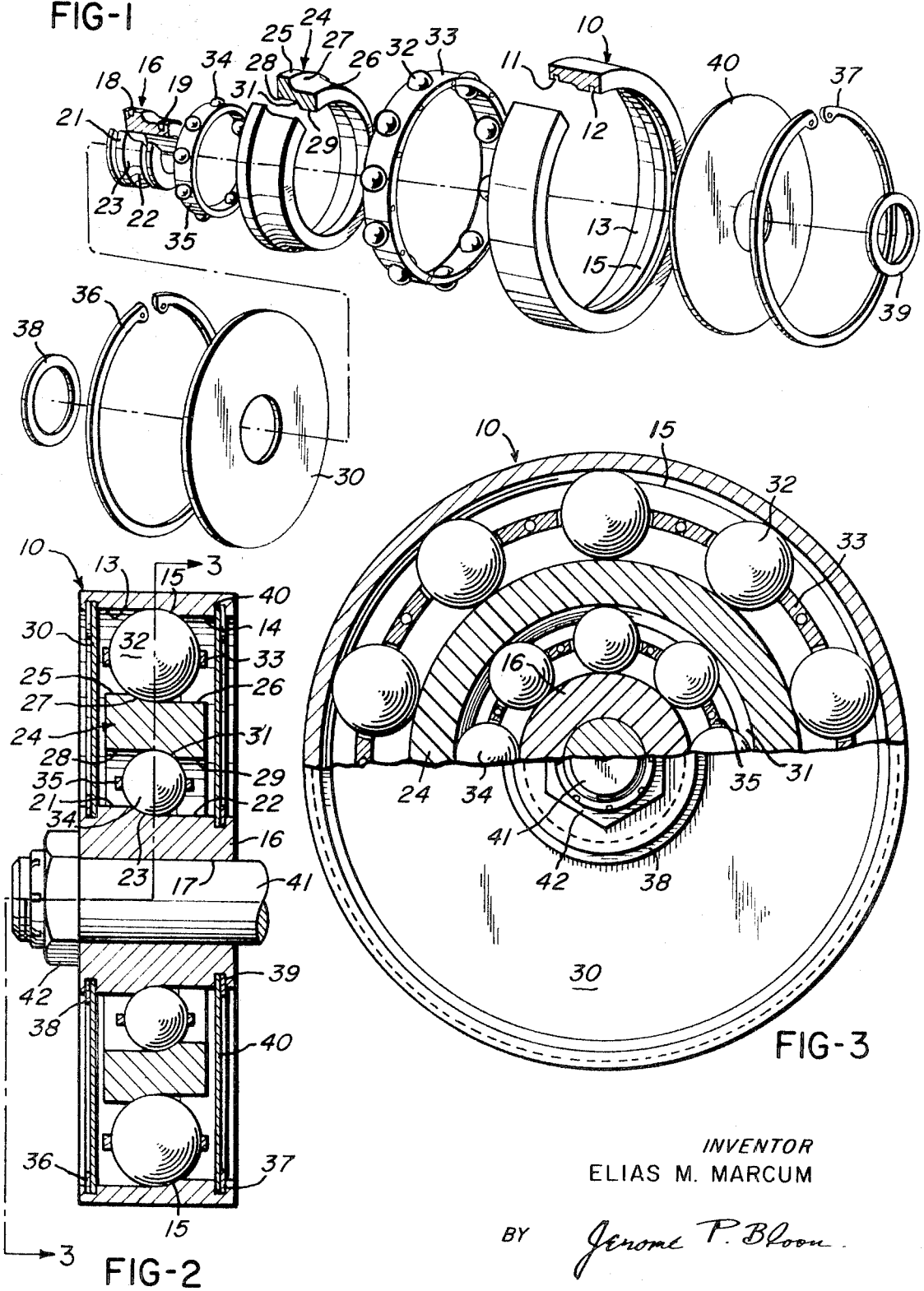

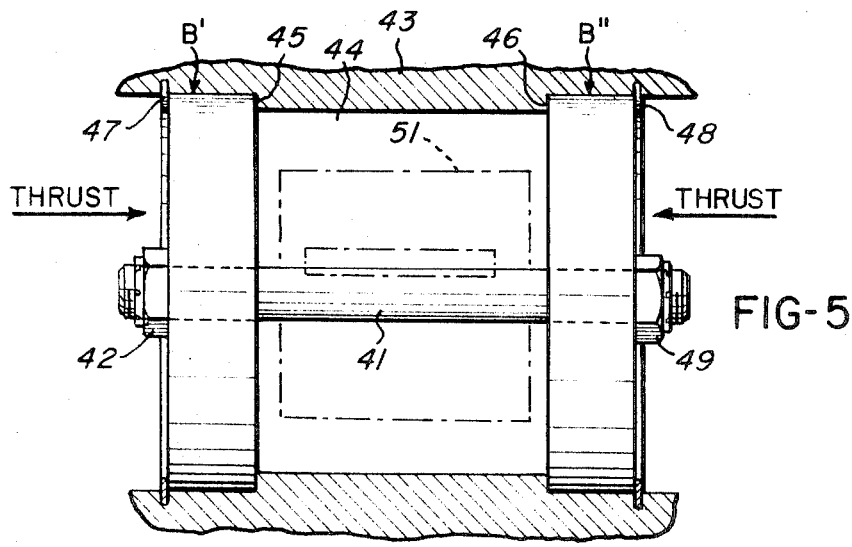
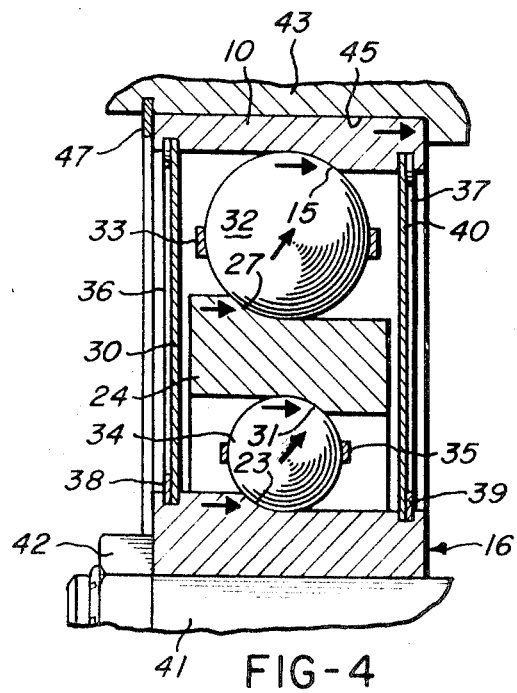
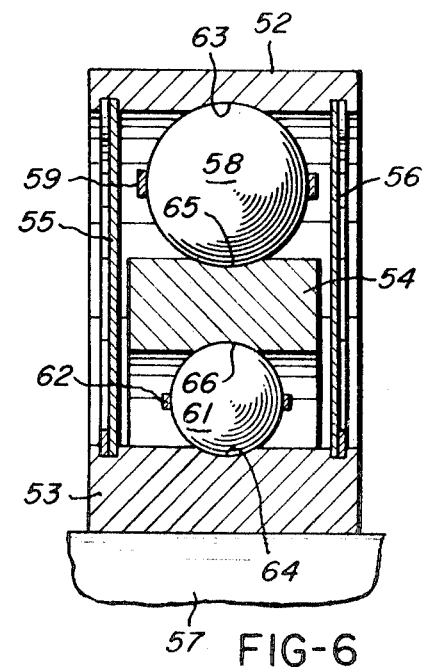

3,597,029

PLANETARY BEARING ASSEMBLY

BACKGROUND OF THE INVENTION

This invention relates to bearing assemblies having particular advantage in high-speed installations, such as required in a turbine engine for example, It will be so described, though not so limited in application.

Bearing assemblies of the prior art have been variously contrived in an effort to simplify their fabrication, make them run smoother and quieter, and give them a longer and more effective operating life. Particular concern has been directed to high-speed applications with limited success. In such applications conventional bearing units have a high rate of wear and their effective bearing life is relatively short. In many cases a bearing unit will freeze, with attendant and severe damage to the associated structure. This has been due, at least in part, to the fact a conventional bearing assembly is so structured that the components are subjected to a high degree of stress. The applied forces are not properly dissipated. THese and other problems are overcome by the use of the present invention.

SUMMARY OF THE INVENTION

Embodiments of the present invention feature concentric sets of bearings and at least one spacer in the form of a planetary race element. THe bearing elements are differentially sized and so designed that the bearings remote from the driven race will rotate at reduced speeds. This effectively reduces the load on both the bearing assembly and the driving shaft and has a twofold advantage. The life of the bearing assembly is extended and the possibility of bearing failure is lessened. An attendant benefit is the possibility of reducing the rated capacity of the prime mover.

In the event, moreover, that one bearing set may freeze, the invention unit can still serve a bearing function.

Preferred embodiments of the invention have optimal stress-dissipating characteristics. This is achieved by uniquely formed and disposed raceways, the bearing abutted surfaces of which are successively offset, disposing alternately to either side of a common plane of reference which is centered between the bearing end faces and oriented perpendicular to its central axis.

A primary object of the invention is to provide a bearing unit which is economical to fabricate, more efficient and satisfactory in use, adaptable to a wide variety of applications and unlikely to malfunction.

A further object of the invention is to provide an antifriction bearing assembly having a longer useful life.

Another object of the invention is to provide a bearing assembly featuring one or more planetary race elements designed to produce an effective speed reduction and dissipation of applied stress within the bearing per se.

Still another object of the invention is to provide a planetary-type bearing assembly capable of use to suppress end play in a mounted shaft.

A further object of the invention is to provide a unique high-speed bearing unit featuring race elements including offset bearing surfaces offering successively and relatively inclined paths for dissipation of applied stress.

Still another object of the invention is to provide concentric sets of bearing elements in a rotary bearing assembly affording an ability to produce an effective reduction of applied speed, an absorption of end thrust and an ability to operate if one of the included sets of bearing elements should fail.

An additional object of the invention is to provide a bearing assembly possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawings wherein some but not necessarily all the forms of embodiment of the invention may be illustrated, FIG. 1 is an exploded view, in perspective, of a bearing assembly in accordance with an illustrated embodiment of the invention, in which the bearing is adapted for absorption of end thrust;

FIG. 2 is a view in cross section of a bearing as shown in FIG. 1;

FIG. 3 is a view partly in end elevation and partly in sectio n, taken substantially along the line 3–3 of FIG. 2;

FIG. 4 is a diagrammatic fragmentary view of a bearing assembly as shown in FIGS. 1 to 3, in an installed position to illustrate its capabilities;

FIG. 5 is a partly diagrammatic view in side elevation of an installation utilizing bearings in accordance with the instant invention in a manner to obviate end play in the mounted shaft; and FIG. 6 is a fragmentary view in cross section of a bearing assembly in accordance with a second illustrated form of the invention wherein the bearing is adapted primarily for radial loading.

Like parts are indicated by similar characters of reference throughout the several views.

Referring to the drawings, in accordance with a preferred thrust-sustaining embodiment thereof, a bearing assembly of the invention comprises an outer case 10 constructed as a segment of a cylinder. Ends of the outer case are square or perpendicular to the axis thereof for flush seating to a containing body. The exterior or outer periphery of the case is smoothly formed for like reasons. Noting FIG. 2 of the drawings, the interior or inner periphery of the case is differentially formed from end to end. One end portion 13 is formed on a larger radius than the other end portion 14 and the portions 13 and 14 are spaced and offset by a surface portion 15 which, in cross section, has an arcuate configuration. The inner surface of the case is formed adjacent each end with a continuous circumferential groove, 11 and 12 respectively. Thus, viewing the case in cross section, between the grooves 11 and 12 the inner periphery of case 10 is formed with radially offset flat surfaces 13 and 14 interconnected by an arcuate surface 15. The surfaces 13 and 14 are of differential length, the former being relatively longer to extend to a plane passing through the geometric center of the case 10, perpendicular to the case axis. It is noted that in the instance illustrated in FIG. 2 of the drawings, the arcuate surface 15 is formed on a radius the center of which lies in the aforementioned plane.

Surface 15 is continuous throughout the inner periphery of the case 10 and, as will be seen, forms an annular ball raceway, the case 10 in which it is formed becoming an outer race element.

An inner race element is represented by a concentrically positioned cylindrical hublike body 16 having a central through aperture 17. On the outer periphery of element 16 are circumferential end grooves 18 and 19 corresponding in position to and aligned with the grooves 11 and 12 in the part 10. The outer peripheral surface of the element 16 has a configuration like that on the inner peripheral surface of the case 10 but reversed from end to end. THus, noting the cross-sectional view in FIG. 2 of the drawings, the outer surface of the body 16 has radially displace flats 21 and 22 connected by an arcuately formed surface 23 forming an offset therebetween. In this latter instance the surface portion 22 on the body 16 extends from one end thereof to the aforementioned plane passing through the geometric center of the case, which plane also includes the center of the radius on which the surface portion 23 is formed. THe surface portion 23 is thus provided to act as a ball race which is continuous around the outer periphery of the body 16.

Positioned intermediate the outer race element 10 and the inner race element or hub 16 is a planetary race element 24.

The latter has a ring shape. Its outside diameter is substantially less than the inside diameter of the element 10 and its inside diameter exceeds the outside diameter of the element 16. In length the element 24 is shorter than the elements 10 and 16 and it is so dimensioned and disposed to lie within the boundaries of planes defined by the grooves 11 and 18 to the one side and 12 and 19 to its other side. Viewing the outer periphery of the planetary race element 24, portions are formed on different radii to reveal in cross sections, shown in FIG. 2, flats 25 and 26, each on a different uniform radius, offset and spaced by an interconnecting arcuate surface 27. Similarly, the element 24 is formed on its inner periphery with flats 28 and 29 separated and offset by an interconnecting arcuate surface 31. The configurations on the outer and inner peripheries of element 24 are similar but in a relatively inverse relation so the respective arcuate surface portions 27 and 31 lie on immediately opposite sides of the aforementioned plane passing through the geometric center of the case 10. Also, the surfaces 27 and 31 are formed on radii the centers of which lie in this plane.

It is noted that the surface portion 27 of the planetary race element is formed on the same radius as the surface portion 15 on the inner periphery of the case 10. Similarly, the inner peripheral surface portion 31 is formed on the same radius as the surface portion 23 of the hub 16. This enables that there be interposed between the outer race element 10 and the planetary race element 24 the ball bearings 32. The latter are held in a separated relation relative to one another by a carrier ring 33, the balls being freely rotatable in through openings formed in the ring. Also, interposed between the inner race element 16 and the planetary race element 24 is a set of ball bearings 34 carried by and freely rotatable in a ring 35. In the one instance the surface portions 15 and 27 form complementary bearing surfaces for the ball bearings 32 and in the other instance the surface portions 23 and 31 provide complementary surfaces of the ball bearings 34.

The grooves in the inner periphery of race element 10 and in the outer periphery of race element 16 provide a means of mounting annular plate closure elements 30 and 40. These serve the function of excluding dirt and retaining lubricating fluid in the bearing assembly so contrived. They are preferably sufficiently flexible to facilitate their being pressed in place within their mounting grooves and to be removable easily therefrom, when required. A retaining ring 36 is installed in the groove 11 and a similar ring 37 in groove 12 to maintain the plate closure elements in place at their outer periphery. At their inner peripheries, the closure 30 and 40 are held in place by flexible washers 38 and 39 installed, respectively, in the circumferential grooves 18 and 19 of element 16.

In the bearing structure as assembled, it will be seen that balls 32 are received between and confined by diametrically opposite arcuate surfaces 15 and 27 which define a raceway the centerline of which is in an inclined intersecting relation to said central plane of the bearing assembly which is perpendicular to its axis. Similarly, the arcuate surfaces 31 and 23 define a raceway for balls 34 which is in an inclined intersecting relation to the same plane. The inclination of the respective raceways is in a similar sense.

Particular attention is directed to the fact that the balls 32 are greater in diameter than the balls 34 and the spacing between the seating surfaces on the outer periphery of race element 24 and the inner periphery of race element 10 is made to conform to the diameter of balls 32 for a close fit of the balls within the defined raceways. Similarly, the spacing between the seating surfaces on the inner periphery of planetary race element 24 and the outer periphery of inner race element 16 is made to conform to the diameter of the smaller balls 34 so they are held closely to seats in the raceway formation defined by surface portions 23 and 31.

According to one method of assembling the unit, the set of bearings 34 with its carrier ring 35 is slipped over the smaller diameter surface portion 22 of the inner race element 16 to seat the ball bearings to the arcuate surface portion 23. Planetary raceway 24 is then applied with a slip fit of surface portion 28 over the ball bearings 34 until the balls seat to its arcuate surface portion 31. The set of ball bearings 32 is then mounted over the outer peripheral portion 26 to seat to the arcuate surface portion 27. Finally, the subassembly so formed is thrust into the outer case 10 in the end thereof defined by the surface portion 13 until it seats to the annular surface portion 15 with a slip fit. Closures 30 and 40 are put in place in the grooves 11 and 12 and 18 and 19 held in place by application of the retaining rings 36, 37 and washers 38, 39. This last restrains relative axial motion between the inner and outer race elements and assists in maintaining the parts in their assembled slip fit relation.

The opening in the inner race element or hub 16 accommodates its mounting to a shaft 41 with respect to which the described assembly performs a bearing function. By means of a shrink fit, keying or otherwise, the inner race element may be made to rotate in unison with the shaft 41. In the example shown, the inner race element 16 is contained on one end by a nut 42 threadedly engaged on the adjacent projected extremity of the shaft. The outer race may be suitably contained at its opposite end by abutment thereof to a fixed surface. It is to be kept in mind that the schematic showing is a single illustration of a method of applying the invention assembly. Other means and methods of application and utilization thereof will be readily apparent to those versed in the art. With the assembly mounted as illustrated in FIG. 2, it will be readily apparent that end thrust or stress applied to the bearing unit either through the medium of the shaft 41 alone or in conjunction with a retention means for the case 10, such as would be normally anticipated, is absorbed in the bearing assembly by dissipation therethrough in staged angular paths. For example, applied forces may be transmitted to the surface 23 to be directed angularly across the central plane of the bearing assembly to the surface 31. The resultant force is then distributed through the body of planetary race element 24 to the surface 27, from which point the here applied stress component is again transmitted angularly through the ball bearings 32 to the outer case at its surface portion 15.

As will be obvious, by such means the bearing assembly of the invention is structured to absorb and dissipate both axial and radial thrust in a most effective manner. The association and disposition of the raceways and the related bearing elements are such to substantially reduce the normal anticipated deteriorating effect of both conventional and abnormal loading of a bearing assembly. Take particular attention that irrespective of the relatively tortuous paths for dissipation of applied forces that the ball bearings are in a common radial plane.

To further contemplate the capacity of the invention bearing assemblies, attention is directed to FIG. 5 of the drawings by way of example. Here the invention units are applied in a manner to obviate end play in a shaft. As shown in FIG. 5, a pair of identical bearing assemblies such as illustrated in FIGS. 1 to 3, here identified as B' and B", are mounted in an opposed longitudinally spaced relation within a housing structure 43. The latter provides a chamber 44 at the ends of which are counterbores 45 and 46 forming shoulders arranged to seat the respective bearing assemblies B' and B". The bearing units are held in place by retaining rings 47 and 48 mounted in grooves in the housing wall. In this case the shaft 41 is shown to commonly mount the bearing assemblies B' and B" the inner race portions of which are fixed thereto for rotation therewith. For purposes of illustration the respective projected portions of shaft 41 are threaded to respectively mount in threaded engagement therewith the nuts 42 and 49. The construction and arrangement of parts of the bearing assemblies is a previously described and the nuts 42 and 49 are so applied to fix the respective positions of their inner race elements in the housing 43. Therefore, as seen in FIG. 5 there is a preloading of the bearing assemblies in opposite directions whereby to obviate the end play of the shaft 41.

Attention is directed to FIG. 4 of the drawings which illustrates the nature of the opposed bearing assemblies and the manner in which they will respectively transmit applied forces and dissipate stress, which manner ensures that the shaft 41 will operate in its prescribed position and with a minimizing of the effect of such operation on the related bearing units. In the schematic illustration of FIG. 5, it is observed that the shaft 41 may have rotary vanes 51 or the like fixed thereto within the chamber 44 for drive of the shaft in a rotary sense, as by compressed gases expanding within the chamber upon introduction thereof through a suitable inlet passage. Of course, either or both ends of the shaft will be extended for suitable delivery to another element of the rotary impulse so applied.

Attention is now directed to a further structural feature of the invention. It will be observed, noting the drawings, that in use of the bearing assemblies there is, in effect, a speed reduction within the assembly per se which assists in the reduction of the normal wear found in a conventional bearing assembly, and therefore prolongs the useful life of the assembly. For example under the influence of the rotating shaft 41, the body element 16 which embodies the inner raceway 23 will be driven in correspondence with the drive of the shaft. This induces a rolling movement of the set of balls 34 within the raceway defined by arcuate surfaces 23 and 31. There is an inherent reduction, of course, in the relative speed of the balls 34. The drive of the balls 34 is then transmitted through the surface portion 31 of the planetary race element 24 to drive the race element 24 at a slightly lesser speed. The relation of the speed of the element 24 to the shaft 41 will be in correspondence with the diameter of the balls 34. Involved are centrifugal force effects and driving torque. In turn, the race element 24 drives through its surface 27 the larger ball bearings 32. In this instance there are dual factors which cause the ball bearings 32 to move at a significantly lesser speed of rotation than the ball elements 34. In the first instance, the ball elements 32 may be appropriately sized larger than the ball elements 34 to create an inherent reduction in this manner. Secondly, the ball elements 32 will roll in the raceway defined by the surface portions 15 and 27 of the planetary and outer race elements with a loss factor due to the staged and tortuous path through which forces are applied to result in a drive of the ball elements 32.

By proper selection of bearing diameters, the effective speed reduction of the components of the bearing assembly in a radial outward sense may be varied, the final reduction being determined by the actual speed of rotation of the outer set of bearings. Thus, for a given speed of rotation of the shaft 41, the speed of rotation of the outer set of bearings can, by selection of bearing diameters, be reduced to a selected speed, as for example 20 percent of shaft speed. The net effect in any instance is a reduction in the effective speed to be sustained in and dispersed within the bearing assembly. Consequently, not only do we have an inherent and highly advantageous path for distribution of radial forces and thrust applied to the bearing unit but we have a bearing unit within which the speed of rotation of the various components thereof can be staged to further reduce the incidence of wear which would normally be anticipated, particularly under high-speed conditions. The effective speed reduction achieved by the invention bearing assembly enables a performance which would be the result of a normal shaft speed which is less than actually encountered. The advantages are believed obvious.

The bearing structure of FIGS. 1 through 5 has special reference to installations in which thrust loads are or may be a factor to be considered in reference to the applied bearing units. This is the preferred embodiment of the invention. A modification thereof, as shown in FIG. 6, may enable the advantages of the effective speed reduction to be retained for certain applications where the assembly is to be adapted for sustaining loads which are primarily radial. As shown in the instance of FIG. 6, there is an outer case or race element 52, an inner race element 53 and an intermediate race element 54 disposed in the same orientation as corresponding elements 10, 16, and 24 of the first-described embodiment. Here closures 55 and 56 are mounted in and to interconnect the inner and outer race elements as and in a manner previously described with reference to the first embodiment. Also, the intermediate race element 54 is centered between the closures 55 and 56 as is the element 24.

In reference to FIG. 6, the inner race element 53 is shown as mounted to a shaft 57 for unison rotation therewith in any suitable manner. The details thereof are not pertinent to an understanding of the invention and are therefore not further described. Here, between the outer race element 52 and the planetary race element 54 is a set of ball bearings 58 carried by separator ring 59. Between the inner race element 53 and the planetary race element 54 is a set of ball bearings 61 carried by a separator ring 62. The bearings 61 are smaller in size than the bearings 58 to have a particular mathematical relation in size to that of the ball bearings 58 as required for the intended application. Unlike the bearing raceways of the first considered embodiment wherein the transmission is in lines intersecting and angularly related to the central plane of the bearing assembly, the raceways of the FIG. 6 embodiment are formed as grooves having their centers aligned with the central plane of the bearing assembly which is perpendicular to the axis of the shaft 57. Attention is directed to FIG. 6 wherein it is shown that the inner periphery of the outer race element 52 has a surface portion 63 intermediate its end faces which is arcuate in cross section to seat therein the uppermost portions of the ball bearings 58. Similarly, in line with the groove 63 the inner race element 53 has a recess or groove 64 to bearingly seat the remote surfaces of the inner ball bearings 61. Correspondingly, the planetary race element 54 has aligned grooves in its inner and outer face, respectively 66 and 65, to have opposite portions of the bearings 61 and 58 bear thereon and therein.

The arrangement described in reference to FIG. 6 disposes the ball bearings 61 and 58 in a radial plane fully adapted to sustain the radial thrust exerted by the condition of a rotating shaft 57. The bearings 58 and 61 have been illustrated as having the same proportions as corresponding bearings 32 and 34 of the first and preferred embodiment. The ratio of effective speed reduction from the shaft to the outer bearings will therefore be the same. The bearing assembly so contrived in FIG. 6 is by means of the nested and staged relation of the components admirably suited to achieve the same results as the first-described embodiment with the exception that it is not capable of dissipating thrust and the effect of end play to the degree of the preferred embodiment.

In summary, the disclosed embodiments of the invention illustrated have inherent advantages some of which have been discussed. It may, in addition, be noted that the bearing assembly has been designed with a view to economical construction. It is comprised of few parts easily produced and permitting a simple easy slip fit in a desired arrangement which lends itself to any selected mode of operation.

Attention is directed to the fact that the proportions of the ball bearing elements may be reversed or arranged in any suitable relation and the drive may be by an exterior element as well as an interior element with the same results. The essential feature is the inclusion of an inner or intermediate race element in accordance with the invention concept, which facilitates the simplicity of fabrication and the optimal mode of operation.

As disclosed, the bearing assemblies have been shown as including two concentric sets of bearings. However, there may be any number of concentric sets with additional planetary race elements interposed between adjacent sets, as needs require.

A feature of the disclosed structure, utilizing the planetary concept, is that if during the useful extended life of the assembly one set of bearings should seize or fail to freely rotate in its raceway, the planetary element will still function and the applied loads will be sustained in the remaining set of bearings without damage to the related structure. Thus, even when either set of bearings or one set of any group of bearings fail, the remainder sustain operation, at least for a limited period of time to avoid the problems normally encountered with the use of conventional bearing assemblies.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described my invention, I claim:

1. A bearing assembly, including inner and outer race elements and at least one intermediately disposed planetary race element, one of said inner and outer race elements being adapted to be rotatably driven and the other to be fixed, said rice elements being constructed as segments of cylinders and orienting concentrically of one another with their geometric centers essentially in a common plane perpendicular to the assembly axis, first and second sets of rolling bearings positioned respectively between the inner race element and the planetary race element and between the planetary race element and the outer race element placing said race elements in a disconnected, radially spaced relation, and raceways in said race elements receiving said sets of bearings and positioning them to occupy said common plane, the raceways in said planetary race element being formed to provide an inclining surface on each of the inner and outer peripheries of such element, each inclining surface terminating at its one end generally in said common plane and extending therefrom in a direction opposed to the direction of extension of the other surface, said planetary race element having on each periphery radially displaced but adjacent surfaces parallel to one another and to the assembly axis merging at adjacent ends with the ends of a respective inclining surface to define relatively shallow inversely disposed raceways at the inner and outer peripheries of said planetary race element.

2. A bearing assembly according to claim 1 wherein said rolling bearings are ball bearings, said inclining surfaces are arcuate and formed on radii having their centers generally in said common plane.

3. A bearing assembly according to claim 1, wherein the inner and outer race elements have raceways substantially diametrically opposed to respective raceways in said planetary race element.

4. A bearing assembly according to claim 1, wherein a subassembly comprising the inner race element and the said first set of rolling bearings has a slip fit in said planetary race element with said first set of bearings seating between the raceway in the inner element and the raceway in the inner periphery of the planetary element, and wherein said subassembly with the said second set of bearings mounted thereon and seating to the raceway in the outer periphery of said planetary race element has a slip fit in said outer race element with said second set of bearings seating to the raceway therein, and there are means for maintaining the defined elements and bearings in an assembled relation to form a unitary bearing assembly.

5. A bearing assembly according to claim 3, wherein said last named means provides a connection between said inner and outer race elements and forms therewith an enclosure in protective relation to said planetary race element and said first and second sets of rolling bearings.

6. A bearing assembly according to claim 3, wherein said last-named means comprises annular plate elements interengaged at their inner and outer peripheral edges with said inner and outer race elements respectively to be in an interconnected relation thereto and in end closing relation to the bearing assembly.

7. A bearing assembly according to claim 6, wherein said inner race element is constructed as a hub for securing to a rotary shaft or the like and said outer race element is constructed for application as a relatively stationary bearing case, said hub having on its exterior longitudinally spaced-apart circumferential grooves aligning with corresponding grooves formed in the inner periphery of the outer case, the edges of said plate elements interfitting in said grooves and placing said plate elements in confining relation to said planetary race member, said planetary race member being so dimensioned and disposed to lie within the boundaries of planes occupied by said plate elements and as defined by said aligning grooves.

8. A bearing assembly according to claim 6, wherein said inner race element is formed with a set of longitudinally spaced-apart circumferential grooves aligned with a corresponding set of grooves in the outer race element, said inner and outer elements having radially displaced surfaces on opposite sides of respective raceways therein wherein said sets of grooves are formed, the grooves of each set being spaced apart a distance exceeding the length of the cylinder segment defining said planetary race member, the peripheral edges of said plate elements interfitting in said grooves.